United States Patent [19]

Matsumoto et al.

[11] Patent Number: 5,365,284
[45] Date of Patent: Nov. 15, 1994

[54] LIQUID CRYSTAL DISPLAY DEVICE AND DRIVING METHOD THEREOF

[75] Inventors: Toshio Matsumoto; Shuhei Yasuda; Tokutarou Kusada; Nobuyoshi Nagashima, all of Nara, Japan

[73] Assignee: Sharp Kabushiki Kaisha, Osaka, Japan

[21] Appl. No.: 999,684

[22] Filed: Dec. 31, 1992

Related U.S. Application Data

[63] Continuation of Ser. No. 476,536, Feb. 7, 1990, abandoned.

[30] Foreign Application Priority Data

Feb. 10, 1989 [JP] Japan .................. 1-32324
Nov. 30, 1989 [JP] Japan .................. 1-313663

[51] Int. Cl.$^5$ .................................... H04N 5/74
[52] U.S. Cl. .................... 348/793; 345/99; 345/100
[58] Field of Search .......... 358/236, 231, 232, 60, 358/61, 152, 140; 340/784; 350/333; 345/87, 90, 93, 99, 100; H04N 5/74, 9/31

[56] References Cited

U.S. PATENT DOCUMENTS

| | | | |
|---|---|---|---|
| 4,413,256 | 11/1983 | Yasuda et al. | 340/784 |
| 4,509,071 | 4/1985 | Fujimura et al. | 358/140 |
| 4,525,710 | 6/1985 | Hoshi et al. | 340/784 |
| 4,539,592 | 9/1985 | Tanaka et al. | 358/140 |
| 4,602,273 | 7/1986 | Carlson | 358/11 |
| 4,694,349 | 9/1987 | Takeda et al. | 340/784 |
| 4,701,799 | 10/1987 | Yoshimura | 358/152 |
| 4,702,560 | 10/1987 | Endo et al. | 350/333 |
| 4,710,768 | 12/1987 | Takeda et al. | 340/784 |
| 4,746,197 | 5/1988 | Endo et al. | 350/333 |
| 4,758,069 | 7/1988 | Knothe et al. | 340/784 |
| 4,779,085 | 10/1988 | Mizutome et al. | 340/784 |
| 4,845,473 | 7/1989 | Matsuhashi et al. | 340/784 |
| 4,876,596 | 10/1989 | Faroudja | 358/140 |
| 4,908,710 | 3/1990 | Wakai et al. | 358/236 |
| 5,034,735 | 7/1991 | Inoue et al. | 340/784 E |
| 5,057,928 | 10/1991 | Nagashima et al. | 358/236 |
| 5,093,665 | 3/1992 | Tanioka et al. | 340/784 |
| 5,206,634 | 4/1993 | Matsumoto et al. | 345/99 |

FOREIGN PATENT DOCUMENTS

| | | |
|---|---|---|
| 0181598 | 5/1986 | European Pat. Off. . |
| 0216188 | 4/1987 | European Pat. Off. . |
| 0241562 | 4/1987 | European Pat. Off. . |
| 2532501 | 3/1984 | France . |
| 0065065 | 4/1982 | Japan .................. 358/152 |
| 0218275 | 12/1983 | Japan . |
| 2000413 | 1/1979 | Netherlands . |
| 2127252A | 4/1984 | United Kingdom . |
| 2159657A | 12/1985 | United Kingdom . |

*Primary Examiner*—Mark R. Powell
*Assistant Examiner*—Jeffrey S. Murrell

[57] ABSTRACT

In a liquid crystal display device for receiving television signals by an interlace scanning method, number of the rows of pixels and of scan signal lines on a liquid crystal panel is increased to be the same as the number of valid scan lines of 1 frame of television signals. The original video signals to be inputted to the device are compressed to ½, and interpolating signals are added to every line of the compressed signals to form pseudo video signals. Shift register operation of a scan driver and the segment driver are done twice as fast as that in the conventional device, and start timing of the shift register operation of the segment driver is controlled to be shifted by ½ horizontal scanning period between the even field and odd field, while the pseudo video signals are applied to the segment driver. Consequently, to the rows of pixels to which original video signals are applied in the even field and to the rows of pixels to which interpolating signals are applied in the even field, interpolating signals and original video signals are applied in the odd field, respectively. Consequently, display can be carried out seemingly in accordance with the interlace scanning method.

4 Claims, 12 Drawing Sheets

INTERPOLATING SIGNAL

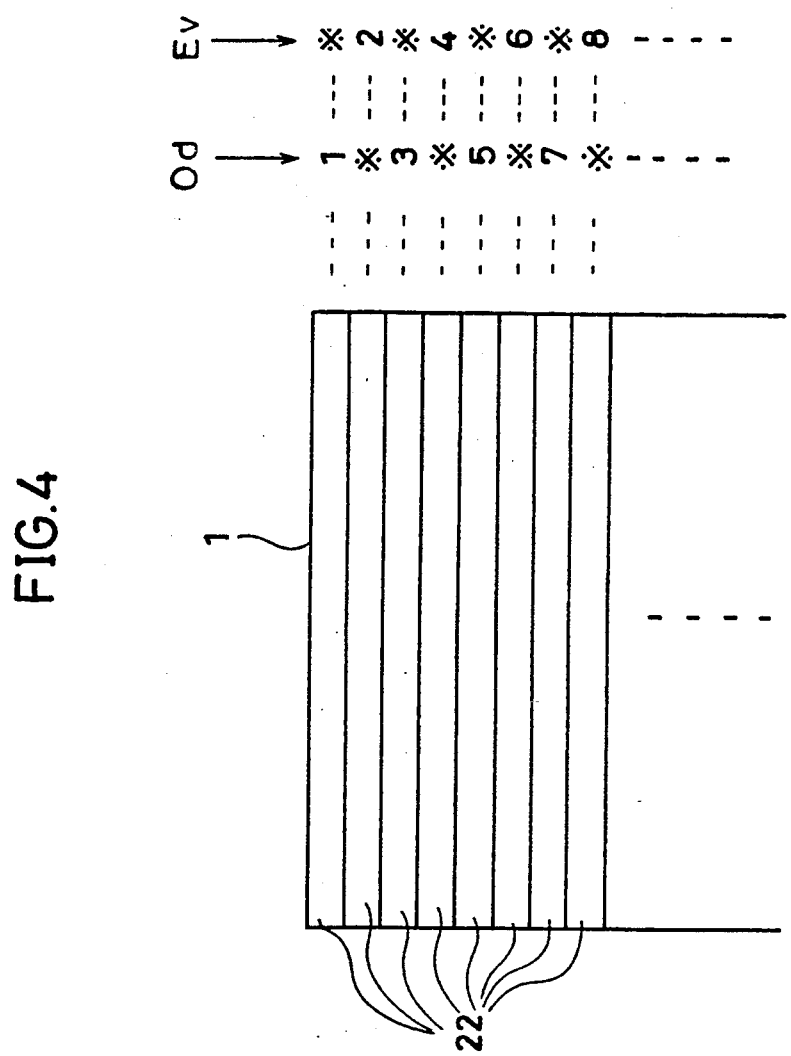

LIQUID CRYSTAL DISPLAY DEVICE AND DRIVING METHOD THEREOF

This application is a continuation of application Ser. No. 07/476,536, filed on Feb. 7, 1990, now abandoned.

BACKGROUND OF THE INVENTION

1. Field of the Invention

The present invention relates to a display device of a television receiver and, more specifically, to a liquid crystal display device employing a liquid crystal panel.

2. Description of the Background Art

CRT (Cathode-Ray Tube) displays have been widely used as display devices for television receivers. However, the depth of a CRT display can not be reduced due to the structural limit, and when the screen size is enlarged, the weight of the display is increased remarkably for implosion protection. Therefore, liquid crystal display devices having various applicability have been developed to take the place of CRT displays. A liquid crystal display device employs a liquid crystal panel in a video displaying portion thereof.

Light transmittance of a liquid crystal changes dependent on the magnitude of the voltage applied thereto. Therefore, when a large number of minute transparent electrodes are arranged on a liquid crystal panel, in which a light source is arranged on one side of a liquid crystal panel and liquid crystal is sandwiched by glass plates and the like, and various voltages are applied thereto, arbitrarily images can be formed on the panel with the brightness/darkness thereof dependent on the voltages applied thereto. Accordingly, desired images can be reproduced by applying voltages corresponding to the brightness of each portion of the images to be reproduced to the electrodes at corresponding positions on the panel. The liquid crystal display device utilizes this idea.

FIG. 11A is a schematic block diagram showing one example of a structure of a conventional liquid crystal display in a television receiver. Referring to the figure, the liquid crystal display device comprises a liquid crystal panel 61 displaying received images; a segment driver 62 and a scan driver 63 for applying signal voltages to the liquid crystal panel 61 for driving the same; a polarity inverting circuit 68 for inverting polarity of a received video signal; and a timing control circuit 69 for controlling the operation timings of the segment driver 62, the scan driver 63 and of the polarity inverting circuit 68.

In the liquid crystal panel 61, liquid crystal is sandwiched by glass plates or the like, and the panel is divided into pixels by a number of minute electrodes arranged in horizontal and vertical directions to form a matrix. FIG. 11B is a partial schematic diagram showing the structure on the liquid crystal panel 61. Referring to the figure, the liquid crystal panel 61 has M data signal lines 64 positioned parallel to each other in a vertical direction, and N scan signal lines 65 arranged parallel to each other in the horizontal direction. In the figure, each of the M×N portions on the panel surrounded by the data signal lines 64 and the scan signal lines 65 is a pixel. A pair of pixel electrodes 67 sandwiching the panel (the rear surface of the liquid crystal 61 is omitted) are provided for each pixel. A transparent electrode is used as the pixel electrode 67. In addition, a switching element 66 is provided for each pixel on a liquid crystal panel 61, so that the liquid crystal panel 61 is a so-called active matrix LCD (Liquid Crystal Display). The switching element 66 is provided between the corresponding pixel electrode 67 and the corresponding data signal line 64 with the ON/OFF controlled by a signal applied to the corresponding scan signal line 65. More specifically, when the corresponding switching element 66 is ON, the voltage on the corresponding data signal line 64 is applied to the pixel electrode 67. Consequently, a voltage is applied to the liquid crystal sandwiched by the corresponding pixel electrode pair, and the intensity of the transmitted light of the liquid crystal at that portion changes dependent on the applied voltage.

N scan signal lines 65 from the liquid crystal panel 61 are connected to the scan driver 63. The scan driver 63 drives the signal lines 65 by the same period as the horizontal scanning period of the received video signals, in response to a driver controlling signal from the timing control circuit 69. More specifically, it successively applies in the said period to each of the N scan signal lines 65 a signal for turning the corresponding switching means 66 ON (in the following, the scan signal line to which such a voltage is applied is referred to as a selected scan signal line).

M data signal lines 64 from the liquid crystal panel 61 are connected to the segment driver 62. The segment driver 62 drives the signal lines 64 in the same period as the horizontal scanning period of the received video signals, in response to the driver controlling signal from the timing control circuit 69. More specifically, it samples the video signal inputted through the polarity inverting circuit 68 in the said period, and internally transfers and outputs the same to apply to the corresponding data signal lines 64 successively. The timing control circuit 69 receives a synchronizing signal separated from the received video signal, and applies corresponding driver controlling signal and polarity inverting timing control signal to the segment driver 62 and the scan driver 63, and to the polarity inverting circuit 68, respectively.

The polarity inverting circuit 68 inverts the polarity of the received video signal and applies the same to the segment driver 62 in a period corresponding to the polarity inverting timing controlling signal from the timing control circuit 69. This is done from the following reason. Generally, an alternating voltage must be applied for driving the liquid crystal. Therefore, by inverting the polarity of the video signal voltage in prescribed period to apply the same to the liquid crystal, the polarity of the voltage applied to the same portion of the liquid crystal in the liquid crystal panel is changed every time, whereby the voltage applied to the liquid crystal is turned into an alternating voltage.

The operation of the liquid crystal display device will be described in the following.

The received video signal including synchronizing signal is applied to the polarity inverting circuit 68, while the synchronizing signal is separated therefrom to be applied to the timing control circuit 69.

The timing control circuit 69 forms the driver controlling signal and the polarity inverting timing control signal from the inputted synchronizing signal to output these signals to prescribed functional portions mentioned above.

In the a polarity inverting circuit 68, polarity inverting process for the inputted video signal is carried out in a prescribed period in synchronization with the polarity inverting timing controlling signal. Therefore, the polarity inverting process and the polarity non-inverting process (in which inversion is not carried out) are carried out alternately in response to the polarity inverting timing controlling signal. The inverted or non-inverted video signal is applied to the segment driver 62.

The segment driver 62 and the scan driver 63 both operate in synchronization with the driver controlling signal.

The scan driver 63 operates in synchronization with the driver controlling signal. Therefore, the scan driver 63 selects the N scan signal lines 65 starting from the upper portion one line in every horizontal scanning period of the received video signal successively and repeatedly.

Meanwhile, the segment driver 62 carries out the following operation in synchronization with the driver controlling signal. Namely, in every horizontal scanning period of the received video signal, it samples M signal voltages corresponding to each of the M pixels of one row of the liquid crystal panel 61, out of the inputted video signals of one horizontal scanning period, and the sampled signal voltages are transferred and outputted to the corresponding data signal line. It goes without saying that the switching means of each of the corresponding pixels must be ON when these M signal voltages are applied to liquid crystal of each of the pixels of the liquid crystal panel 61 through the corresponding data signal line. Therefore, each of the M signal voltages is applied to each of a row of pixel electrodes provided corresponding to the scan signal line selected by the scan driver 63 at that time. Consequently, video signals of 1 horizontal scanning period out of the received video signals are reproduced by the row of pixels. Meanwhile, the selected scan signal line is successively shifted at every horizontal scanning period by the scan driver 63. The video signals inputted to the segment driver 62 are the signals provided by successive scanning of the screen in the horizontal direction in the transmitting side, which are serially continuous signals. Therefore, when the above described operation of the segment driver 62 is repeated for N times, the received video signals of 1 field provide an image display on the liquid crystal panel 61.

Generally, when television images are transmitted, interlace scanning such as shown in FIG. 12 is carried out. FIG. 12 illustrates the interlace scanning. Referring to the figure, a television screen 71 on which the images to be transmitted are displayed is scanned along $2n-1$ scan lines in total represented by solid lines and dotted lines. The numbers (1 to $2n-1$) allotted to the scanning lines in the figure represent the order of scanning of the scanning lines in the actual scanning. In this manner, in actual scanning, the horizontal scan lines on the television screen 71 are not scanned one by one starting from the upper portion but every other scan lines (scan lines represented by solid lines in the figure) are scanned starting from the upper portion first. Thereafter, horizontal scan lines (represented by dotted lines) between the previously scanned lines (solid lines) are scanned successively. Namely, one image plane, that is, 1 frame is scanned by two times of scanning. Consequently, in the interlace scanning, video signals of 1 field formed by the second scanning are transmitted serially following the video signals of 1 field formed by the first scanning. In order to accurately reproduce the original images from such video signals, the image reproducing process of the receiver receiving these signals should be as follows. Namely, rough images constituted by half of the scan lines of the receiving apparatus on a display screen of the receiver side must be formed based on the video signals provided by the first scanning of the transmitting side. Thereafter, images constituted by the remaining half of scan lines must be formed based on the video signal provided by the second scanning of the transmitting side. On this occasion, when the second image reproduction is carried out, scanning is done between each of the scan lines scanned during the first reproduction. Namely, the transmitted video signals of one image frame are reproduced by these two image reproduction processes. When the display device of the receiver is a CRT display, this method is employed in accordance with the NTSC (National Television System Committee) specification and the number of valid scan lines appearing on the screen is 440 to 480 in accordance with the NTSC specification.

Now, in a receiver employing the liquid crystal display device, the number of scan lines, that is, the number of pixel rows is 220 to 240 (hereinafter this number is represented as $N_H$) at present. In addition, in the image reproduction process of such a receiver, the scan signal lines provided corresponding to said scan lines are successively selected one by one starting from the upper portion, and video signals are applied to the corresponding pixel rows. Therefore, there are the following problems when video signals of the interlace specification are received by a receiver employing a conventional liquid crystal display device.

Since the number of scan lines of the display device in the receiver side is half of the number of scan lines in the transmitting side, the positional relation between the received images (1 frame in the transmitting side) reproduced by two image reproduction processes differs from the original positional relation scanned in the transmitting side. FIG. 13 shows the image reproduction process in a television receiver employing the currently available liquid crystal display device. Description will be given in the following with reference to the figure, in which successive numbers are allotted to the scan lines starting from the upper portion of the screen.

The correspondence between the video signals provided by scanning even numbered scan lines and provided by scanning odd numbered scan lines in the transmitting side and the scan lines on the display screen on the receiving side on which the signals are reproduced is as shown in the figure. Namely, video signals provided from each of the odd numbered scan lines Od of the transmitting side successively correspond to the scan lines 82 on the display screen 81 in the first image reproduction in the receiving side. The video signals provided from the even numbered scan lines Ev of the transmitting side successively correspond to the scan lines 82 on the display screen 81 in the second image reproduction. Therefore, the odd numbered scan lines Od and the even numbered scan lines Ev of the transmitting side, which should appear alternately on the receiving apparatus, overlap with each other at the same position, as shown in the figure.

Consequently, vertical resolution of the reproduced image in the receiving side is considerably inferior to that of the images (original images) of the transmitting side. In other words, although video signals are formed with high fidelity to the original images by scanning 440 to 480 scanning lines, video signals of 1 field of the original images are reproduced by 220 to 240 scan lines in the receiving side, so that only rough images can be provided. In order to solve such a problem, the number of scan lines of the display screen (liquid crystal panel) of the liquid crystal display device, that is, the number of scan signal lines, must be increased to be approximately the same as that of the CRT display.

However, in the conventional liquid crystal technique, it was difficult to produce a liquid crystal display screen having so many scan signal lines. Further, even if such a liquid crystal display screen was produced, there were various problem in driving the same. Recent development in the liquid crystal technique seems to enable actual application of the above described liquid crystal display screen.

However, the following problem is left unsolved when the number of scan signal lines on the display screen are simply increased than that of the conventional device. When the interlace scanning, as in the CRT, is to be simply carried out on the liquid crystal display device, the following method may be used. Namely, the conventional method in which scan signal lines are successively selected one by one from the upper portion in the conventional liquid crystal display device is changed such that every other scan signal lines are scanned first starting from the upper portion, and the scan signal lines not selected in the first scanning are selected in the second time, also starting from the upper portion. Namely, the odd numbered scan signal lines are successively selected according to the order, and the even numbered scan signal lines are successively selected according to the order. However, in this method, there are always non-selected scan signal lines during scanning, and application of video signals are not carried out in the pixel electrodes corresponding to the non selected signal lines. Therefore, previously reproduced information are continuously displayed on the pixels corresponding to the non selected signal lines. When images with rapid movement are to be reproduced, accurate reproduction cannot be expected.

SUMMARY OF THE INVENTION

Therefore, an object of the present invention is to provide a liquid crystal display device realizing vertical resolution as high as that in a CRT display device.

Another object of the present invention is to provide a liquid display device capable of displaying images with less flickers.

A further object of the present invention is to provide a liquid crystal display device capable of providing image display with superior vertical resolution and less flickers.

The above described objects of the present invention can be attained by a liquid crystal display device of the present invention comprising: a converting circuit for time-compressing original video signals of the interlace specification to $\frac{1}{2}$ time period in every horizontal scanning period and for converting the original video signals into pseudo video signals by interpolating signals similar or the same as any of the compressed signals in the compressed signals; a liquid crystal panel having substantially the same number of scan signal lines as the number of valid scan lines of 1 frame of television signals and liquid crystal pixels arranged in a matrix of rows and columns; a scan driver operating at a frequency twice as much as the horizontal scanning frequency of the original video signals for driving by scanning the scan signal lines of said liquid crystal panel; and timing controlling circuit for making the operation timing of the scan driver in a first field constituting 1 frame of the original video signals different from the operation timing of the scan driver in a second field by $\frac{1}{2}$ time period of the horizontal scanning period of the original video signals. The liquid crystal display device in accordance with the present invention further comprises a segment driver for driving the liquid crystal pixels in a frequency cycle twice that of the horizontal scanning frequency of the original video signals, responsive to the pseudo video signals.

Since the liquid crystal display device of the present invention is structured as described above, the original video signals display images on every other pixel rows shifted by 1 row of pixel between the first and second fields, with the interpolating signals interpolated in the row of pixels to which the original video signals are applied. Therefore, in the liquid crystal display device in accordance with the present invention, the video signals of 1 frame of the transmitting side can be received and reproduce images in the original positional relation, whereby display with high resolution can be realized.

In accordance with a preferred embodiment, the original video signals are analog signals, and the converting circuit comprises: an A/D converter for converting the original video signals to digital signals; a memory for storing digital signals converted by the A/D converter by every horizontal scanning period with the data reading speed controlled such that the digital signals of one horizontal scanning period are continuously read twice in one horizontal scanning period; an inverting circuit for inverting polarity of the digital signals read from the memory in every $\frac{1}{2}$ horizontal scanning period; and a D/A converter for converting the digital signals outputted from the inverting circuit into analog signals.

According to another preferred embodiment, the converting circuit comprises a bit inverter for inverting polarity of each bit of the data read from the memory and a switching circuit, and is alternately adapted to apply outputs from the memory and the outputs from the bit inverter to the D/A converter in every $\frac{1}{2}$ horizontal scanning period by using the switching circuit.

In accordance with another preferred embodiment, the liquid crystal display device in accordance with the present invention drives liquid crystal pixels in response to original video signals of the interlace specification, which comprises a liquid crystal panel including substantially the same number of scan signal lines arranged in one direction as the number of valid scan lines of 1 frame of television signals and liquid crystal pixels arranged in a matrix of rows and columns; a scan signal line driving circuit for successively driving pairs of adjacent scan signal lines in a first combination in a first field of the first and second fields constituting 1 frame and for successively driving pairs of adjacent scan signal lines which are different from the said pairs in the second field; and a pixel driving circuit driving liquid crystal pixels connected to the scan signal lines driven by the scan signal line driving circuit, in response to the original video signals. By the scan signal line driving circuit, the combination of the scan signal lines simultaneously driven in the first field is shifted from the combination of the scan signal lines simultaneously driven in the second field by 1 scan signal line. Therefore, the position on the liquid crystal panel on which images are displayed in the first field is shifted from the position on the liquid crystal panel on which images are displayed in the second field by one row. Consequently, image display equivalent to that of interlace scanning for the CRT display is realized on the liquid crystal panel.

In accordance with another preferred embodiment, the scan signal line driving circuit comprises a first scan driver connected to the odd-numbered scan signal lines for successively driving by scanning these signal lines one by one; a second scan driver connected to the even numbered scan signal lines for successively driving by scanning these signal lines one by one; and a controlling circuit for simultaneously starting the operations of the first and second scan drivers in the first field and for making the operation start timing of the first scan driver different from that of the second scan driver in the second field by 1 horizontal scanning period.

In accordance with a more preferred embodiment, the pixel driving circuit comprises an inverting circuit for inverting polarities of the original video signals in every field and in every horizontal scanning period, and a circuit portion for applying the outputs from the inverting circuit to the liquid crystal pixels connected to the scan signal lines driven by the scan signal line driving circuit.

Since the pixel driving circuit is structured as described above, the polarities of the signal voltages applied to each row of pixels are inverted in every frame, and the timing of polarity inversion of the signal voltages applied to one row of pixels is shifted by one field period. Therefore, although the fluctuation frequency of the intensity of the liquid crystal transmitted light of 1 row of pixels is 15 Hz, the intensity of the liquid crystal transmitted light of a plurality of rows of pixels becomes 60 Hz, whereby flickers are hardly recognized in the images displayed on the panel.

In another preferred embodiment, the inverting circuit comprises: a polarity inverting circuit for inverting polarities of the input signals; a separating and extracting circuit for separating and extracting horizontal synchronizing signals and vertical synchronizing signals out of composite synchronizing signals including the horizontal and vertical synchronizing signals, corresponding to the original video signals; a first forming circuit for forming a first signal with the polarity inverted at every horizontal period by dividing the horizontal synchronizing signal separated and extracted by the separating and extracting circuit; a second forming circuit for forming a second signal with the polarity inverted at every frame period by dividing the vertical synchronizing signals separated and extracted by the separating and extracting circuit by 2; a third forming circuit for forming a third signal with the polarity inverted at every horizontal scanning period and at every frame period based on the first signal formed by the first forming circuit and on the second signal formed by the second forming circuit; and a controlling circuit for controlling the timing of inversion of the polarity in the polarity inverting circuit based on the third signal formed by the third forming circuit.

The first forming circuit is formed of a flipflop circuit, and the second forming circuit is formed of a first flipflop circuit for dividing once the vertical synchronizing signal and a second flipflop circuit for further dividing, once, the vertical synchronizing signal divided by the first flipflop circuit, respectively.

In accordance with the liquid crystal display device of the present invention, images can be reproduced with superior vertical resolution and less flickers compared with the prior art, from the television signals formed in accordance with the interlace scanning method. In addition, in the former mentioned liquid crystal display device, it is possible to provide reproduced images having higher resolution than the CRT display by making some changes in interpolating signals inserted corresponding to the movement of images and so on.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows correspondence between the scan lines on the screen of the liquid crystal display device of the said embodiment and the scan lines on the screen of the transmitting side;

DESCRIPTION OF THE PREFERRED EMBODIMENTS

Figure 1A:
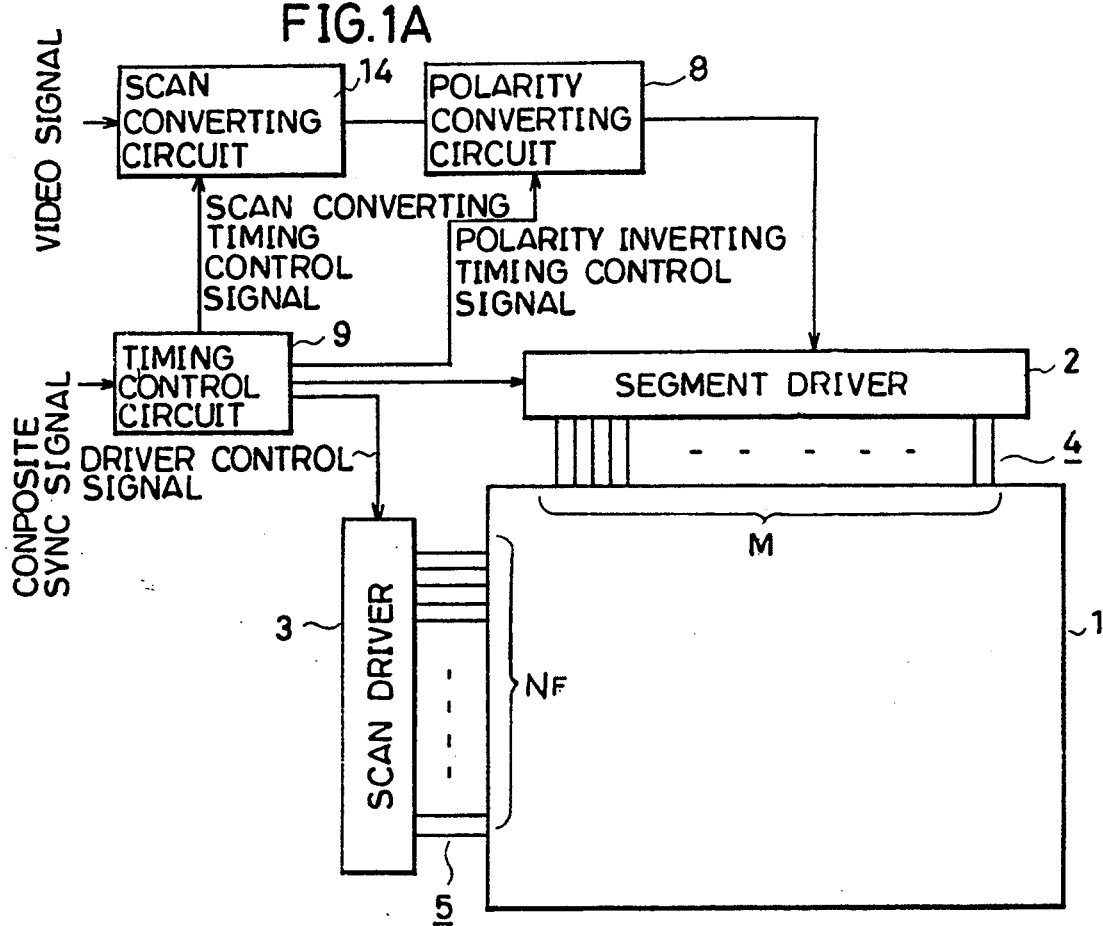
FIG. 1A shows a whole structure of a liquid crystal display device in accordance with one embodiment of the present invention.

FIG. 1A is a schematic block diagram of a liquid crystal display device showing one embodiment of the present invention. Referring to the figure, the liquid crystal display device comprises, as in the conventional device, a liquid crystal panel 1, a scan driver 3, a segment driver 2, a timing control circuit 9 and a polarity inverting circuit 8. Basic functions of these components are the same as in the conventional liquid crystal display device. However, unlike the conventional device, the number of scan signal lines on the liquid crystal panel 1 corresponds to the number of valid scanning lines of 1 frame in accordance with the NTSC specification (440 to 480, this number will be represented as $N_F$ in the following).

Figure 1B:
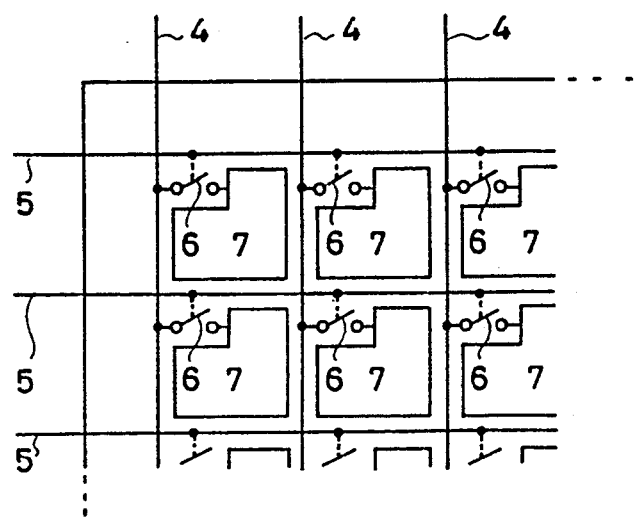
FIG. 1B is a plan view showing a structure of a liquid crystal panel shown in FIG. 1A.

Fig. 1B is a partial schematic diagram showing the structure of the liquid crystal panel 1. Referring to the figure, the liquid crystal panel comprises M data signal lines 4 arranged in parallel to each other in the vertical direction, and $N_F (N_F \approx 2N_H)$ of scan signal lines 5, the number of which is twice that of the conventional device, arranged in parallel to each other in the horizontal direction. As in the conventional device, the liquid crystal panel comprises a pixel electrode 7 and the switching means 6 for each pixel surrounded by the data signal line 4 and the scan signal line 5.

Unlike the conventional device, the scan driver 3 and the segment driver 2 drive these lines at ½ period of the horizontal scanning period of the received video signals (hereinafter the received video signals are called as original video signals). Unlike the conventional device, the liquid crystal display device further comprises a scan converting circuit 14. The timing control circuit 9 outputs a driver controlling signal for driving the scan driver 3 and the segment driver 2 in the above described period, and a signal for controlling the operation timing of the scan converting circuit 14.

The scan converting circuit 14 time-compresses the original video signals to ½ in synchronization with the scan converting timing signal from the timing control circuit 9.

As in the conventional device, the original video signals have the synchronizing signals included therein. The original video signals having the synchronizing signals are applied to the polarity inverting circuit 8 through the scan converting circuit 14 unlike the conventional device. The synchronizing signals are applied to the timing control circuit 9 as in the conventional device.

In the timing control circuit 9, the driver control signal for driving the scan driver 3 and the segment driver 2, the polarity inverting timing control signal for driving the polarity inverting circuit and a scan converting timing controlling signal for driving the scan converting circuit 14 are formed from the inputted synchronizing signals to be outputted. The polarity inverting timing control signal is a clock signal having ½ period of the horizontal scanning period of the original video signals, and the scan converting timing control signal is a clock signal having the same period as the horizontal scanning period of the original video signals.

Figure 2A:
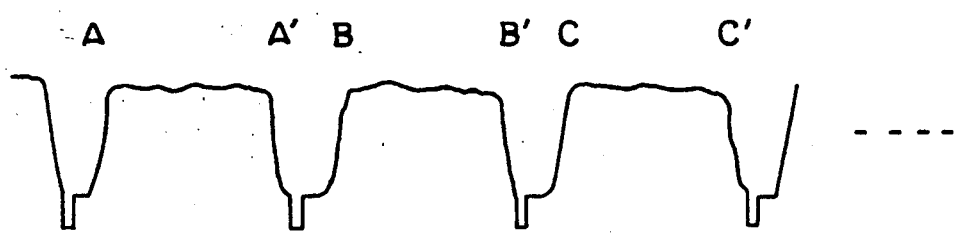
FIG. 2A is a diagram of waveform of an original video signal.
Figure 2B:
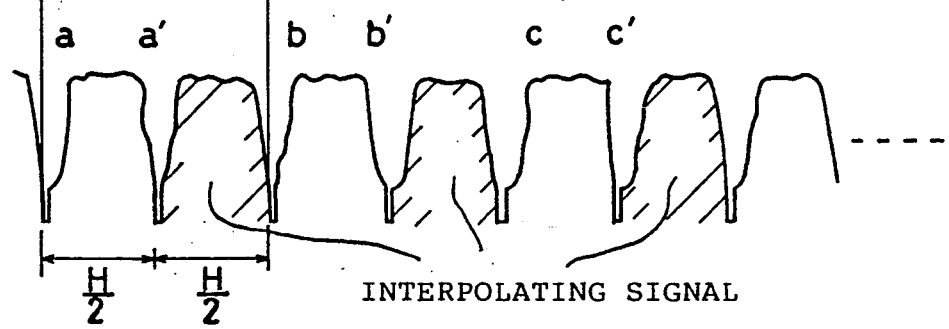
FIG. 2B is a diagram of waveform of a video signal after scan conversion.

The scan converting circuit 14 operates in synchronization with the scan converting timing control signal from the timing control circuit 9. Therefore, the inputted original video signals are time-compressed to ½ in every horizontal scanning period. FIG. 2A is a diagram of waveform of the video signal inputted to the scan converting circuit 14, and FIG. 2B is a diagram of waveform of a video signal (hereinafter referred to as pseudo video signal) outputted from the scan converting circuit 14 after scan conversion. Referring to the figure, the reference character H represents the horizontal scanning period of the original video signal. As shown in the figure, the inputted original video signal (FIG. 2A) is time-compressed to ½ in every horizontal scanning period H, so that the signal waveforms of A—A', B—B', C—C', . . . of the original video signal (FIG. 2A) are compressed to ½ so as to be conversed to the signal waveforms of a—a', b—b', c—c', . . . in FIG. 2B, respectively. In the outputted video signal (FIG. 2B), a signal which is the same as or similar to one of the adjacent signals of a—a', b—b', c—c'. . . is inserted as an interpolating signal. The width of the interpolating signal is also half the horizontal scanning period H of the original video signal, namely, ½ H. Formation of such interpolating signal can be carried out in accordance with a known technique.

Then, the video signal scan-converted in the scan converting circuit 14 as described above, that is, the pseudo video signal is inputted to the polarity inverting circuit 8. The polarity inverting circuit 8 inverts the polarity of the inputted pseudo video signal in synchronization with the polarity inverting timing control signal from the timing control circuit 9. Therefore, the inputted pseudo video signal has its polarity inverted in every horizontal scanning period, H/2. Namely, in every horizontal scanning period of the pseudo video signal, that is, H/2, polarity inverting process and polarity non-inverting process are alternately carried out on the inputted pseudo video signal. The pseudo video signal subjected to such processes in the polarity inverting circuit 8 is applied to the segment driver 2.

The segment driver 2 and the scan driver 3 both operate in synchronization with the driver controlling signal from the timing control circuit 9.

The scan driver 3 carries out the same operation as in the conventional device in synchronization with the driver control signal. Namely, the scan driver 3 successively select one scan signal line out of the connected $N_F$ scan signal lines 5 starting from the upper portion at every horizontal scanning period of the pseudo video signal, i.e. H/2.

The segment driver 2 carries out the same operation as in the conventional device in synchronization with the driver control signal. Namely, at every H/2 of the pseudo video signal, it samples M signal voltages out of the pseudo video signals of the H/2 period and transfers and outputs the sampled voltages to the corresponding data signal lines. M signal voltages are applied to respective pixel electrodes provided corresponding to the scan signal lines selected by the scan driver 3 at that time.

Since the original video signal is provided by interlace scanning, the original video signals of 1 field in the transmitting side are applied to the liquid crystal panel 1 when the above described operation of the segment driver 2 is repeated for $N_F$ times. Consequently, the interpolating signals (FIG. 2B) inserted between a—a', b—b', c—c', . . . of the pseudo video signals (FIG. 2B) of 1 field are applied to either the even numbered or odd numbered rows of pixels on the liquid crystal panel 1.

Description will be given in the following on the operation when the pseudo video signals inputted to the segment driver 2 are of the next 1 field of the original video signals.

At that time, the operation of the scan driver 3 is started shifted by the horizontal scanning period of the pseudo video signal, that is, H/2. Consequently, the scan signal lines positioned between the scan signal lines selected for reproducing images from the original video signals of the preceding 1 field are selected for reproducing images from the original video signals of this 1 field. Namely, the scan signal lines selected when the interpolating signals inserted between original video signals of the preceding 1 field reproduce images are replaced by the scan signal lines selected when the interpolating signals inserted between the original video signals of this 1 field reproduce images. Namely, the rows of pixels on which the interpolating signals of this time reproduce images are different from the rows on which the interpolating signals reproduce images when the original video signals of the preceding 1 field reproduce images. FIG. 4 shows the image reproducing process of the present embodiment. The correspondence between the original video signals formed by scanning the odd numbered scan lines and the original video signals formed by scanning even-numbered scan lines and the scan lines on the display screen of the receiving side on which they reproduce images is as shown in the figure. Referring to the figure, the reference character $\chi$ represents the rows of pixels, to which interpolating signals inserted between the original video signals by the scan converting circuit 14 on a receiving side, are provided. Namely, the original video signals provided by the odd numbered scan lines Od of the transmitting side and the interpolating signals therebetween alternately correspond to respective scan lines 22 of the display screen 1 on the receiving side. The original video signals provided from the even numbered scan lines Ev on the transmitting side and the interpolating signals interposed therebetween alternately correspond to scan lines 22 of the display screen 1 on the receiving side. However, unlike the conventional device, the scan lines on the screen of the receiving side corresponding to the former original video signals do not overlap with the scan lines on the screen of the receiving side corresponding to the latter original video signals. Namely, positions on the liquid crystal panel 1 where each of the original video signals of 2 fields constituting 1 frame in the transmitting side coincide with those of the CRT display on which interlace scanning is carried out. As described above, the reproduced images are the same as those provided by receivers employing CRT displays, and thus approximately the same vertical resolution can be realized.

In the present embodiment, the polarity inverting circuit 8 inverts the inputted video signals at every horizontal scanning period H/2 of the converted video signals. This is for applying alternating voltage to the liquid crystal as in the conventional device and for preventing flickers, the effect of which will be described in the following. Generally, if there is, even a little, difference between the absolute values of the voltages of the positive and negative polarities applied to the liquid crystal, the intensity of light transmitted through the liquid crystal fluctuates in the period of 30 Hz, which is the frame frequency. Therefore, if the light intensity fluctuation of all pixels are of the same phase, the light intensity fluctuations of the pixels are emphasized by each other, so that flickers are generated on the screen constituted by these pixels. However, in the present embodiment, the polarity of the pseudo video signal is inverted at every horizontal period of the pseudo video signal, so that the polarities of the voltages applied to adjacent two rows of pixels on the liquid crystal panel 1 are opposite to each other. Therefore, the phase change with time of the voltages applied to the rows of the pixels is inverted in every row. This means that the time fluctuation of the intensity of light transmitted through liquid crystal of respective rows of pixels, that is, characteristics of the fluctuation of light intensity with time become opposite to each other in adjacent rows of pixels. Therefore, the fluctuation of light intensity of the rows of pixels are offset, and therefore, flickers are hardly recognized on the reproduced images on the liquid crystal panel 1 formed of a plurality of pixels.

Figure 5A:
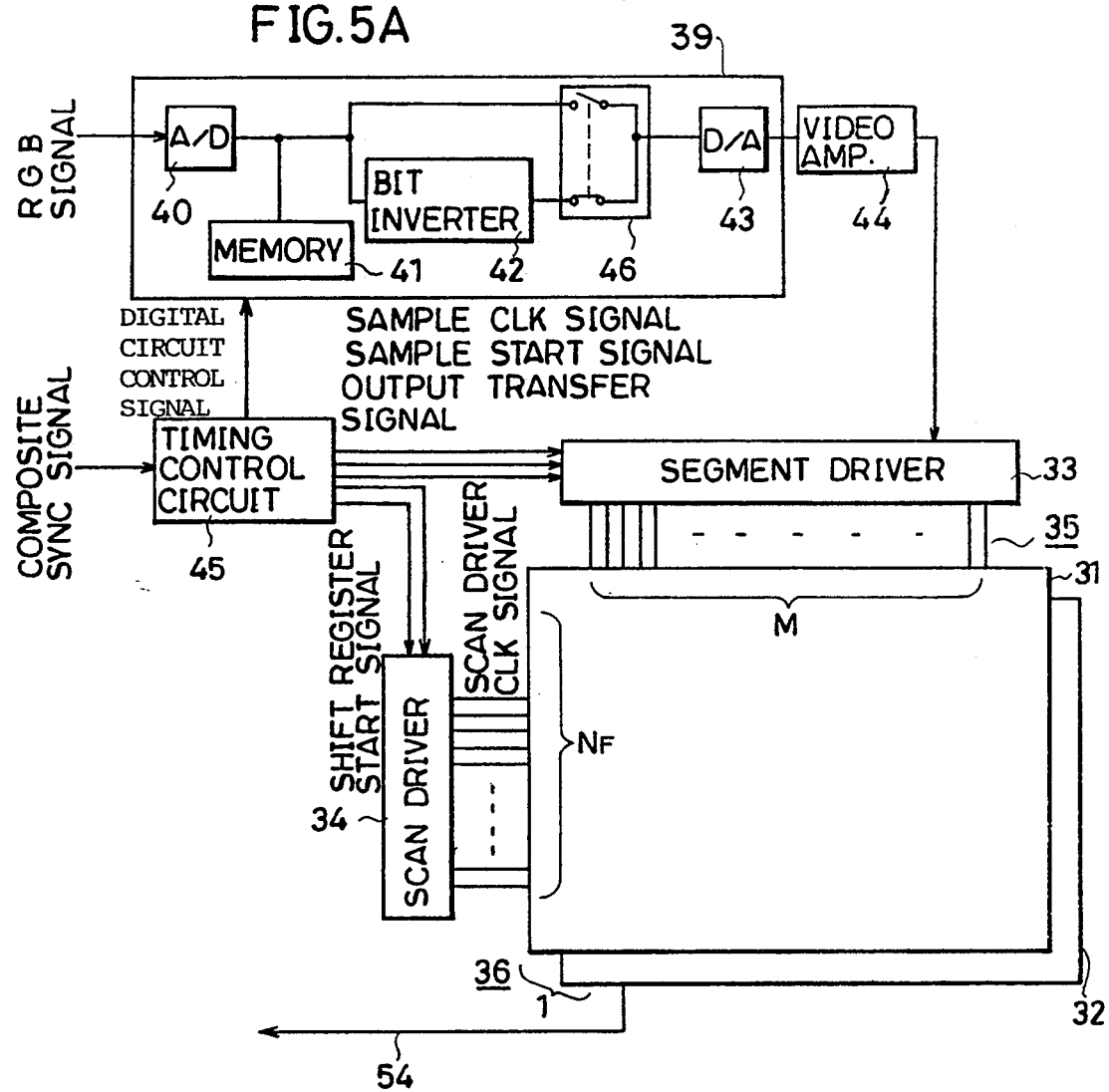
FIG. 5A is a diagram showing a whole structure of the liquid crystal display device more specifically showing the embodiment of the present invention.

FIG. 5A is a schematic block diagram of a liquid crystal display device showing a specific example of this embodiment. Description will be given in the following with reference to the figure. In this example, the transmitted video signals are color television signals including luminance signals indicating luminance of pixels and color signals indicating colors of pixels. In the receiver, the color signals and the luminance signals are once separated from each other, necessary processes are carried out on these signals, and RGB signals which are the final video signals necessary for image reproduction are formed therefrom. Three signals which are the primary elements of color are collectively called as a RGB signal. A series of processes described below on the RGB signal are carried out on all of these three signals.

Figure 5B:
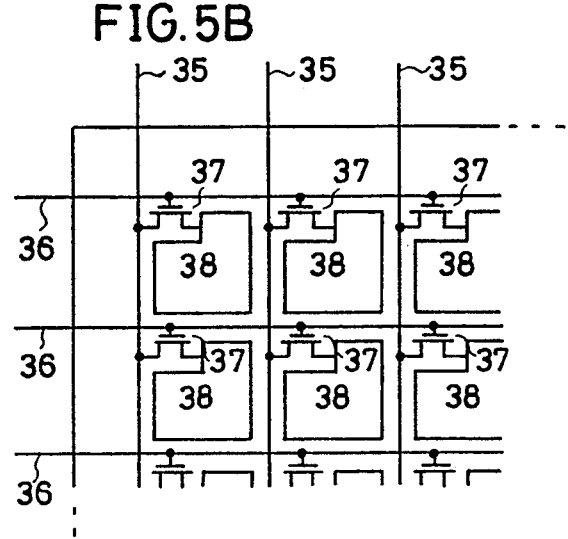
FIG. 5B is a plan view showing a structure of a liquid crystal panel shown in FIG. 5A.

In the liquid crystal display device, the liquid crystal panel is formed of glass plates 31 and 32 and a liquid crystal layer (not shown) provided therebetween. FIG. 5B is a partial plan view showing surface structure of the glass plate 31. Referring to the figure, the glass plate 31 has on its surface $N_F$ scan signal lines 36 in accordance with the number of valid scan lines of 1 frame of television signals arranged in parallel to each other in the horizontal direction and M data signal lines 35 provided in parallel to each other in the vertical direction. A TFT (Thin Film Transistor) 37 is used as the switching means provided for each pixel electrode 38. On the glass plate 32, electrodes (not shown) opposing to the pixel electrodes 38 provided for each of the pixels are formed, and prescribed opposing signal potential is applied to the opposing electrodes through opposing signal lines 54.

The digital circuit 39 is for carrying out scan conversion and polarity inversion described with reference to the former embodiment, on the received video signals.

The segment driver 33 and the scan driver 34 has the same function as described in the foregoing.

The timing control circuit 45 governs all the operations of the above mentioned functional portions, and it has the following functions. Namely, it receives composite synchronizing signals (including various synchronizing signals of horizontal and vertical synchronizing signals) separated from the received video signals. Correspondingly, it forms and outputs a sample start signal for starting a series of sampling operation, a sample clock signal for carrying one sampling operation, and an output transferring signal for internally transferring and outputting sample signal voltages to corresponding data signal lines in the segment driver 33; a scan driver clock signal for selecting one scan signal line, and a shift register start signal for carrying out an operation for selecting scan signal lines one by one successively from the upper portion in the scan driver 34; and a digital circuit controlling signal for carrying out prescribed scan conversion and polarity inversion in the digital circuit 39. More specifically, the sample start signal, the output transfer signal and the scan driver clock signal are clock signals having $\frac{1}{2}$ period of the horizontal scanning period of the original video signals. In addition, the shift register start signal has a pulse waveform shifted by ½ of the horizontal scanning period of the original video signal in 2 fields, when images of 2 fields constituting 1 frame of the transmitting side are reproduced by the liquid crystal display device.

A video amplifier 44 is for amplifying video signals processes by the digital circuit 39, namely, the pseudo video signals to a prescribed level to apply the same to the segment driver 33.

The digital circuit 39 comprises an A/D converter 40 for converting the received analog video signals into digital video signals; a memory portion 41 for storing the video signals which were converted into digital signals by the A/D converter 40; a bit inverter 42 for inverting polarity of the digital video signals read from the memory portion 41; an D/A converter 43 for converting the inputted digital video signals into analog video signals; and a switching circuit 46. Timing of reading the digital video signals from the memory portion 41 and the operation timing of the switching circuit 46 are controlled by a timing control signal from the timing control circuit 45. When digital video signals are read from the memory portion 41, signals of 1 horizontal scanning period of the original video signals are successively read twice.

The operation of the liquid crystal display device will be described in the following.

The composite synchronizing signals separated from the received video signals are applied to the timing control circuit 45, and the RGB signals (hereinafter referred to as the original RGB signal corresponding to the original video signal) are inputted to the A/D converter 40 in the digital circuit 39.

The timing control circuit 45 forms control signals as described above and outputs the same to the prescribed functional portions in response to the inputted composite synchronizing signals.

The A/D converter 40 converts the inputted original RGB signals into digital signals and applies these signals of each horizontal scanning period to the memory portion 41. In this manner, the digitized original RGB signals are written in the memory portion 41. The RGB signals of 1 horizontal scanning period written in the memory portion 41 are successively read twice at a speed twice as fast as that of writing in response to the timing control signal, which is the digital circuit controlling signal, from the timing control circuit 45. Consequently, the read signals of 1 horizontal scanning period are compressed to ½ in time, and the same signals as the above mentioned compressed signals are included in the horizontal scanning period H of the original RGB signals (see FIG. 2B). The signals provided in this manner will be called pseudo RGB signals, compared with the original RGB signals. Namely, in the present embodiment, the interpolating signal is the same as the adjacent video signal.

The switching circuit 46 switches connection such that output from the bit inverter 42 and the output from the memory portion 41 are alternately applied to the D/A converter 43 in the period of H/2, that is, half of the horizontal scanning period of the original RGB signals, in response to the digital circuit controlling signal. Consequently, the polarity of the pseudo RGB signal is inverted in every horizontal period of the pseudo RGB signal, i.e. H/2. In this manner, the pseudo RGB signals subjected to the inverting process or the non-inverting process are converted into analog signals by the D/A converter 43 and thereafter inputted to the video amplifier 44. The video amplifier 44 amplifies the inputted pseudo RGB signals to a prescribed level to apply the same to the segment driver 33.

The scan driver 34 starts the following operation in synchronization with the shift register start signal from the timing control circuit 45. Namely, it successively selects $2N_F$ scan signal lines starting from upper portion to the lower portion one by one in synchronization with the scan driver clock signal from the timing control circuit 45 connected thereto. For this purpose, it applies a high voltage of a constant level as a selecting signal successively from the first scan signal line to the $N_F$ scan signal line for the horizontal scanning period H/2 of the pseudo RGB signal. This voltage is applied to the gate of each of the M transistors provided corresponding to one row of pixel electrodes on the glass plate 31 constituting the liquid crystal panel, to turn the gate ON. However, the shift register start signal for reproducing images based on the original RGB signals formed by scanning odd numbered scan lines in the transmitting side (hereinafter referred to as the odd field time) is shifted by the horizontal scanning period of the pseudo RGB signal. That is, it is shifted H/2 from that for reproducing images based on original RGB signals formed by scanning the even numbered the scan lines in the transmitting side (hereinafter referred to as the even field time).

Figure 3A:
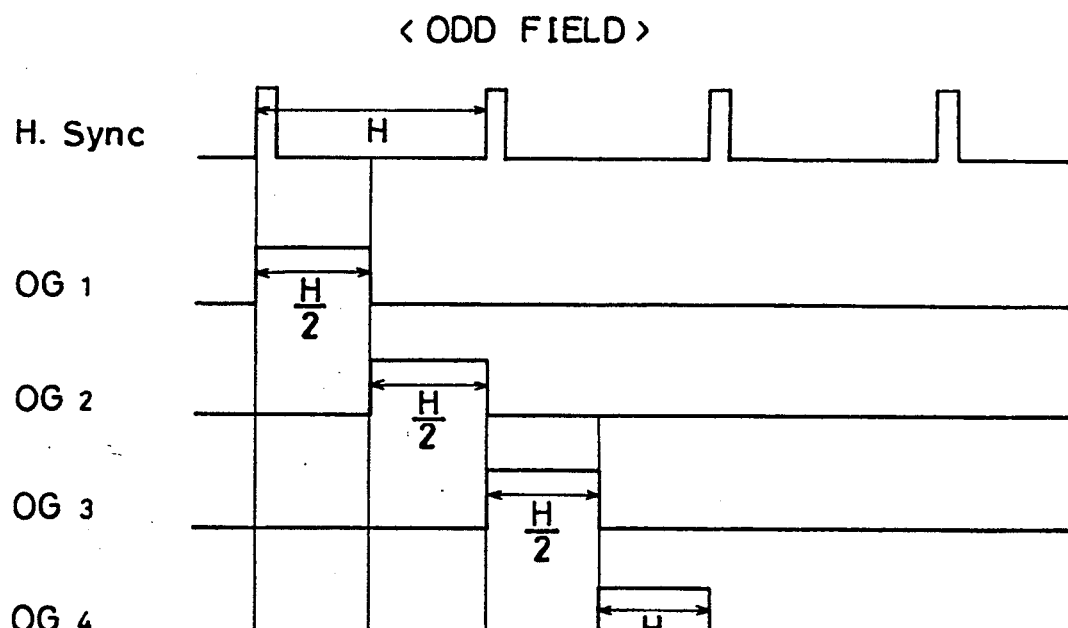
FIGS. 3A and 3B are time charts of selecting signals provided to scan signal lines in the liquid crystal display device shown in FIG. 1A.
Figure 3B:
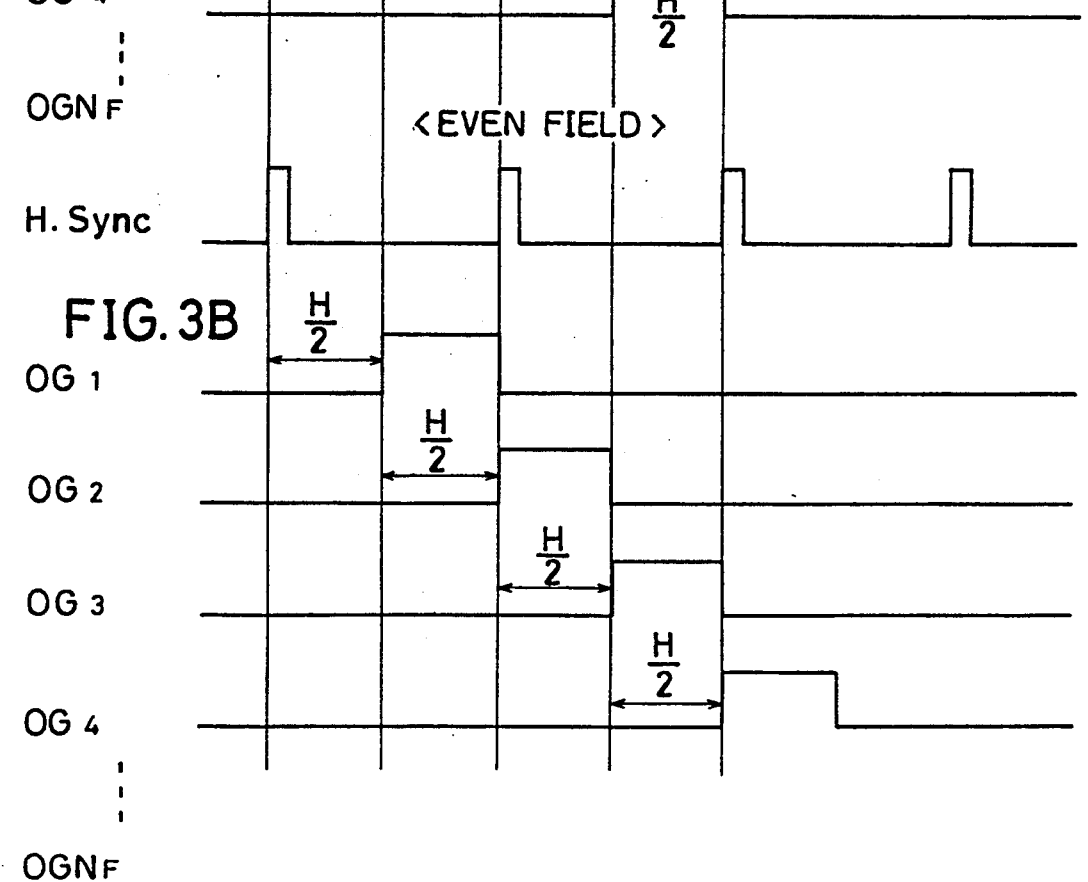

FIG. 3A shows time charts of the selecting signals applied to respective scan signal lines in the odd filed time, and FIG. 3B shows time charts of selecting signals applied to respective scan signal lines in the even field time. For reference, time chart of the horizontal scanning signal (H. Sync) of the original RGB signal is shown in the figure. Referring to the figure, selecting signals OG1, OG3, OG5 . . . applied to the respective odd numbered scan signal lines are all outputted in the former half of the horizontal scanning period H of the original RGB signal in the odd field time, and outputted in the latter half of the horizontal scanning period H of the original RGB signal in the even field time. The selecting signals OG2, OG4, OG6 . . . applied to the respective even numbered scan signal lines are all outputted in the latter half of the horizontal scanning period H of the original RGB signal in the odd field time, and outputted in the former half of the horizontal scanning period H of the original RGB signal in the even field time. Therefore, the time in which the same scan signal line is selected in the even field is shifted by H/2 from that in the odd field time.

Meanwhile, the segment driver 33 starts the following operation in synchronization with the sample start signal from the timing control circuit 45. Namely, it samples M signal voltages from the inputted pseudo RGB signals of the horizontal scanning period H/2 in synchronization with the sample clock signal from the timing control circuit 45. Thereafter, in response to the output transfer signal from the timing control circuit 45, it transfers and outputs the sampled M signal voltages to respective corresponding signal lines. Therefore, at this time, M signal voltages are applied to the pixel electrodes on the liquid crystal panel 31 provided corresponding to the scan signal lines selected by the scan driver 34. By the repetition of this operation for $N_F \times 2$, that is, $2N_F$, the video signals of the odd field and the video signals of the even field in the transmitting side reproduce images on the proper positions on the liquid crystal panel 1 on the receiving side.

Although polarity inversion is carried out on the digitized video signals in the present embodiment, polarity inversion can be carried out on video signal as analog signals. Although the same video signal as the adjacent video signal is used as an interpolating signal in the pseudo video signals, the following method may be used in accordance with the known technique. For example, the video signal of the preceding field and the video signal of the present field are taken selectively as interpolating signals in accordance with the movement of the image. By doing so, the vertical resolution of the reproduced image can be further improved. In addition, when the image transmitted is a static image, this provides significant effect.

Although the series of scan converting processes on the original video signals are carried out on the RGB signals in the present embodiment, the said series of scan converting processes may be done on the luminance signals and the color difference signals.

Figure 6A:
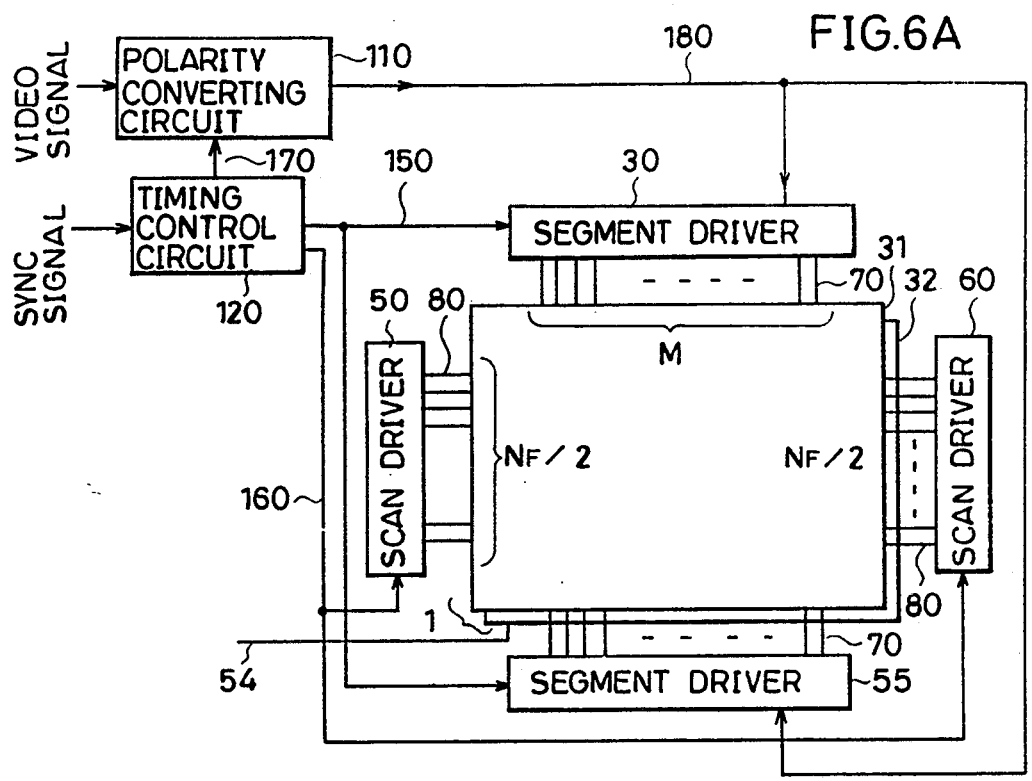
FIG. 6A is a diagram of a whole structure of a liquid crystal display device in accordance with another embodiment of the present invention.

FIG. 6A is a diagram showing a structure of a liquid crystal display device in accordance with another embodiment of the present invention.

Referring to FIG. 6A, the liquid crystal display device has a liquid crystal panel of the same structure as the liquid crystal panel in the specific example of the above described embodiment. Namely, the liquid crystal panel of the liquid crystal display device comprises: a TFT side glass plate 31 on which formed are TFTs 37 used as switching elements for switching each of the pixel, pixel electrodes 38 for applying voltages to the pixels, $N_F$ scan signal lines 80 each connected to the gate electrode of each TFT 37 and M data signal lines 70 each connected to the source electrode of each of the TFTs 37; a porous electrode side glass plate 32 on which electrodes (not shown) opposing to the pixel electrodes 38 are formed; and a liquid crystal layer (not shown) formed between these plates. The state of the liquid crystal is changed dependent on the voltage applied to the pixel electrode 38 and to the opposing electrode formed on the glass plate 32 on the opposing electrode side, whereby the amount of light transmitted therethrough is controlled.

Now, when the voltage level of a scan signal line 80 attains high enough, the TFT 37 connected to the scan signal line 80 is turned ON, whereby current flows between the source electrode and the drain electrode, so that charges are stored in the pixel electrode 38. Thereafter, when the voltage level of the scan signal line 80 returns to the original low value, the TFT 37 is turned OFF, the source • drain becomes a higher resistance, so that the charges stored in the pixel electrode 38 are held as they are. Voltage difference between the potential of the pixel electrode and the opposing signal potential applied to the opposing electrode from the opposing signal line 54 is applied to the liquid crystal layer until the TFT 37 is again turned ON. Images are displayed on the liquid crystal panel 1 by the repetition of this operation successively in the vertical direction.

Figure 6B:
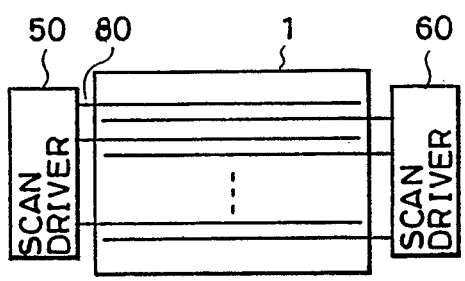
FIG. 6B shows connection between scan signal lines and a scan driver of FIG. 6A.
Figure 6C:
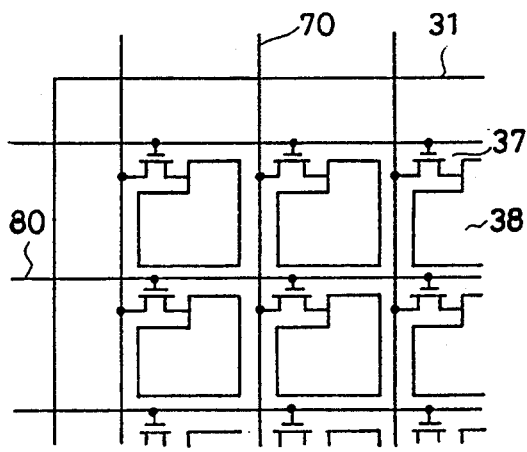
FIG. 6C is a plan view showing a structure of a liquid crystal panel shown in FIG. 6A.
Figure 7A:
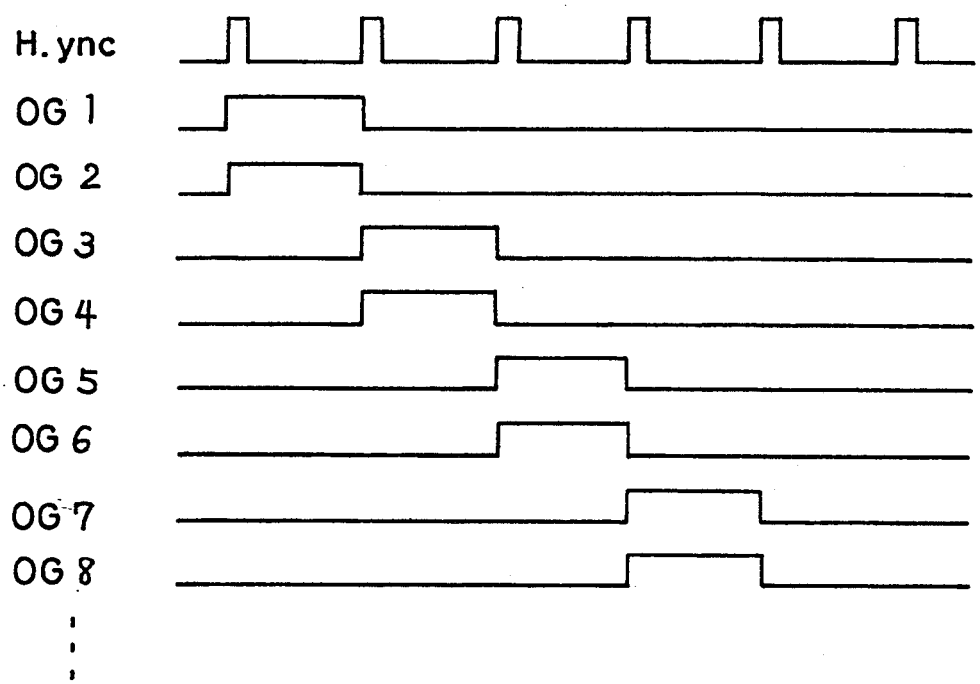
FIGS. 7A and 7B are output signal time charts of the scan driver shown in FIG. 6A in odd field and even field.
Figure 7B:
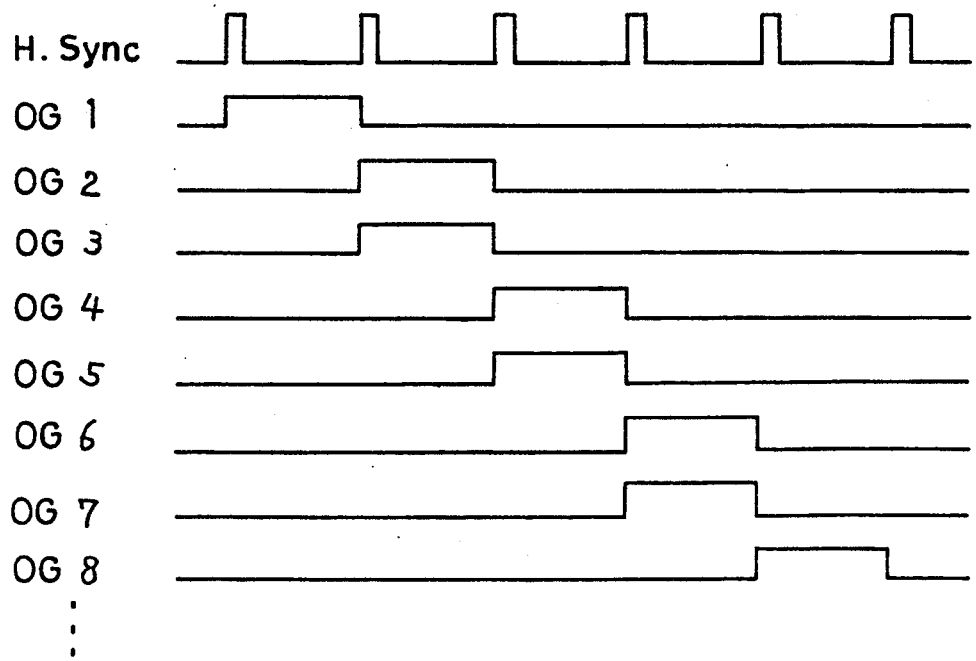

A liquid crystal display device of this embodiment further comprises two scan drivers 50 and 60 driving the scan signal lines 80, segment drivers 30 and 55 for driving the data signal lines 70, a polarity inverting circuit 110 and a timing control circuit 120. Different from the above described embodiment, the $N_F$ scan signal lines 80 are taken to the left and right sides alternately one by one as shown in FIG. 6B to be connected to two different scan drivers 50 and 60, in the liquid crystal display device. The scan drivers 50 and 60 output signals in accordance with simple shift register operation. The scan driver 50 is connected to $N_F/2$ scan signal lines 80 which are the odd numbered ones counted from the upper portion of the liquid crystal panel 1 to drive the same. The scan driver 60 is connected to $N_F/2$ scan signal lines 80 which are the even numbered ones to drive the same. In the following, the scan drivers 50 and 60 are referred to as odd driver and even driver. These two drivers start operation simultaneously in one of the 2 fields constituting 1 frame, and in the other field, the even driver 60 starts operation delayed by 1 horizontal scanning period H from the odd driver 50. Consequently, the selecting signals OG1, OG2, . . . applied to each of the scan signal lines in the liquid crystal panel 1 are as shown in FIG. 7A in one field, and they are as shown in FIG. 7B in the other field.

Let us assume as an example, that the operations of the scan drivers 50 and 60 are started simultaneously in the odd field and the operation of the even driver 60 is started delayed by one horizontal scanning period H from the operation of the odd driver 50 in the even field. In that case, in the odd field, selecting signals are simultaneously applied to the first and second scan signal lines in the first horizontal scanning period, and video signals are applied from the segment driver 30 or 55 to two rows of pixels through TFTs 37 connected to both signal lines. In the next horizontal scanning period, the third and fourth scan signal lines are simultaneously selected, and in the second next horizontal scanning period, the fifth and the sixth scan signal lines are simultaneously selected. Thereafter, these two scan signal lines are successively selected (scanned), so that all scan signal lines 80 are scanned in the period of 1 field. Meanwhile, in the even field, selecting signals are applied to two scan signal lines 80 simultaneously, but the combination of the two lines is different from that in the odd field. Namely, in the first horizontal scanning period, the selecting signal is applied only to the first scan signal line, in the next horizontal scanning period, the second and the third signal lines are selected, and in the second next horizontal scanning period, the fourth and the fifth scanning signal lines are selected, and in this manner, all scan signal lines 80 are scanned in the period of 1 field.

Figure 8:
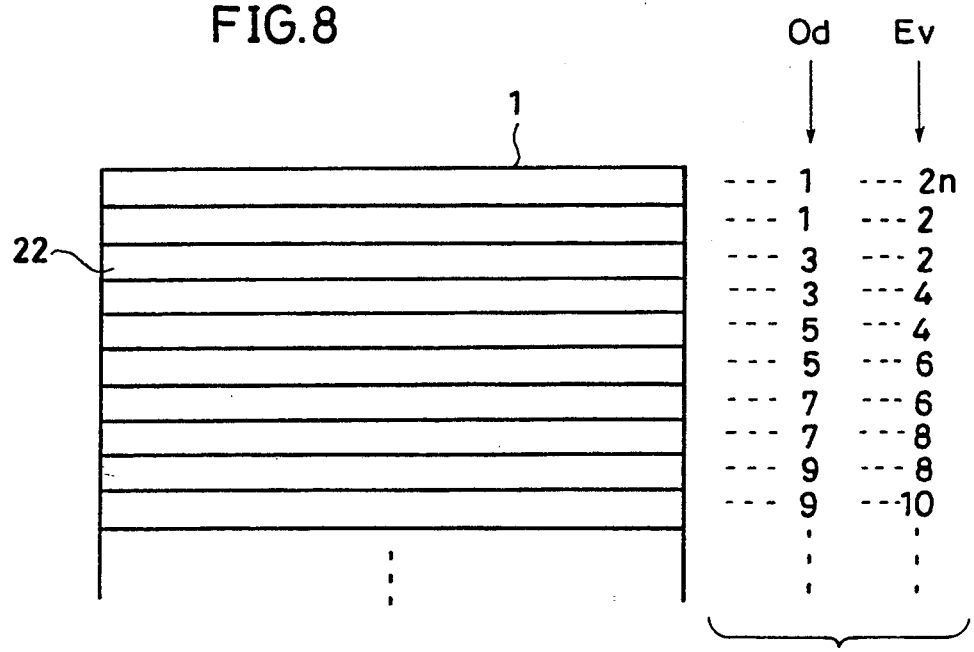
FIG. 8 shows correspondence between the scan lines on the screen of the liquid crystal display device of the said another embodiment and the scan lines on the screen of the receiving side.

When the scan signal lines 80 are selected in this manner, video signals display images on the rows of pixels 22 on the liquid crystal panel 1 with the positional relation between the original video signals being as shown in FIG. 8. Namely, in the receiving side, the original video signals provided from the odd numbered scan lines Od in the transmitting side display images at positions shifted by one row of pixels from the original video signals provided from the even numbered scan lines Ev in the transmitting side. In other words, the display by the original video signals is shifted from the even field by one row of pixels in the even field, so that display is provided on rows of pixels between those pixels on which images are displayed in the odd field. Therefore, display similar to that in the interlace system can be provided.

The segment drivers 30 and 55 receive video signals from the polarity inverting circuit 110 and repeat operations such as sampling, internal transfer and output in synchronization with the horizontal scanning period H of the received video signals, as in the conventional liquid crystal display device.

In this embodiment, the two segment drivers 30 and 55 are separately provided on the upper and lower sides of the liquid crystal panel 1, and each of the data signal lines 70 is connected to either the upper or lower segment driver. However, a single segment driver may be provided on one side as in the former embodiment, with all the data signal lines taken to one side to be connected to the segment driver.

In the present embodiment, since the scan signal lines are driven in the above described manner, the polarity of the voltage applied to the liquid crystal of each pixel can not be inverted in every 1 field period (1/60 sec), when the polarity of the video signals are inverted by every horizontal scanning period H as in the conventional device in the polarity inverting circuit 110. More specifically, in the present embodiment, the same video signals are written to two rows of pixels (referred to as a pixel row 1 and a pixel row 2 for convenience) corresponding to the two scan signal lines simultaneously selected in the first field, and in the next field, the timing of writing video signals to the pixel row 1 and to the pixel row 2 constituting the two rows of pixels is shifted by one horizontal scanning period. Therefore, video signals of opposite polarities are inevitably written to the pixel row 1 and the pixel row 2. Therefore, signals of either positive or negative polarity are continuously written for 2 field periods in either the pixel row 1 or the pixel row 2.

Figure 9A:
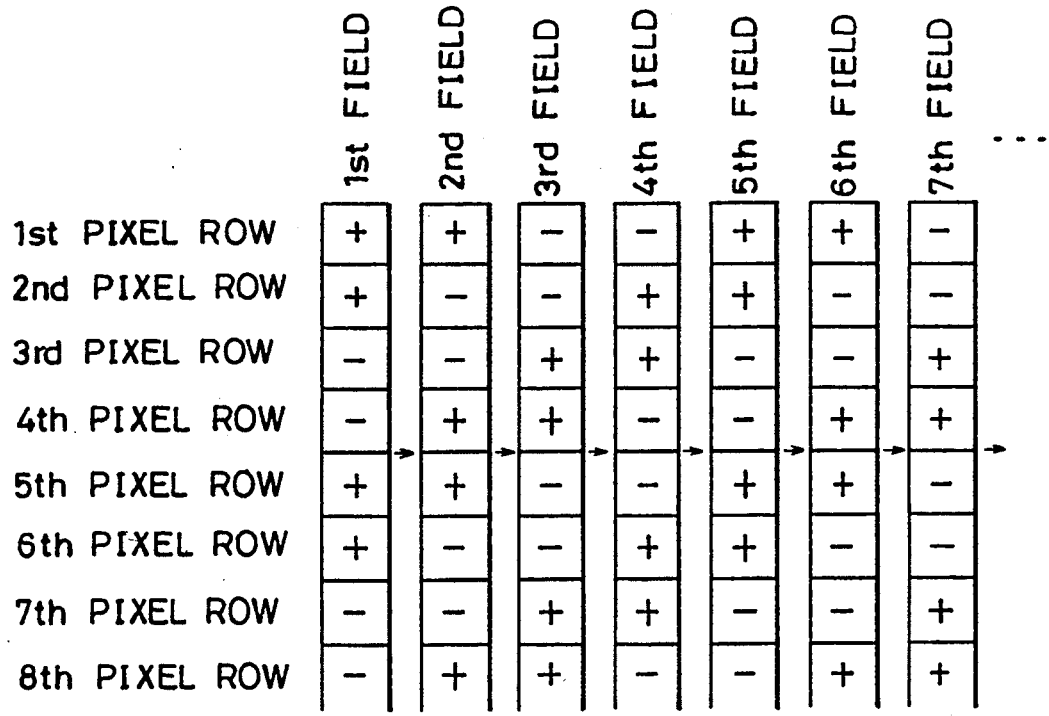
FIGS. 9A and 9B show time transition of the polarities of the voltages applied to respective pixels in the liquid crystal display device of the said another embodiment of the present invention.
Figure 9B:
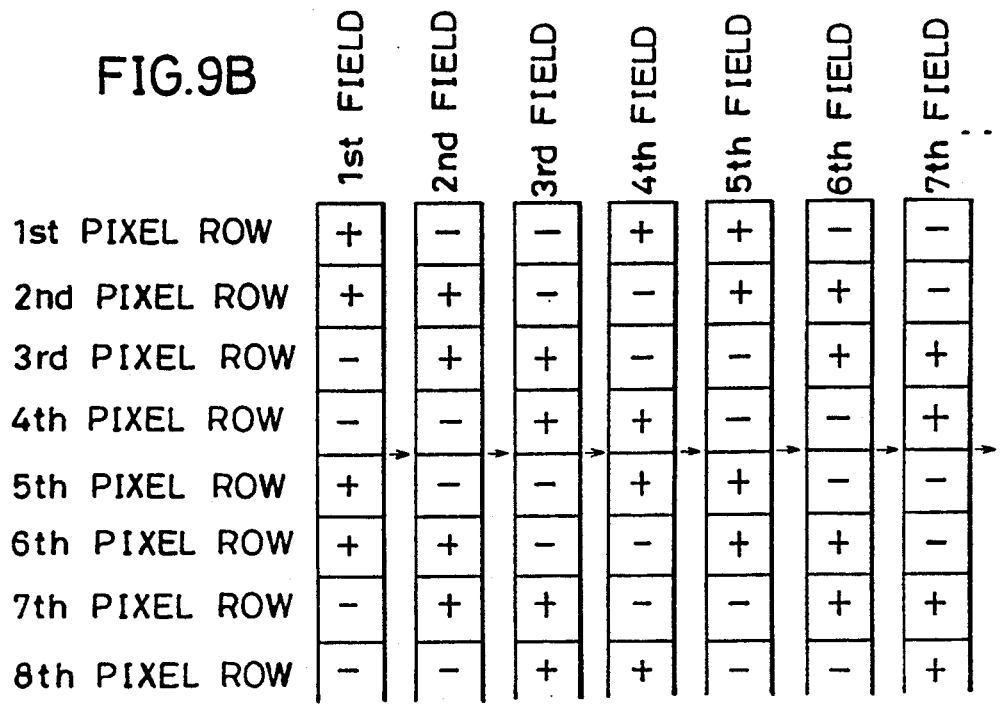
Figure 11A:
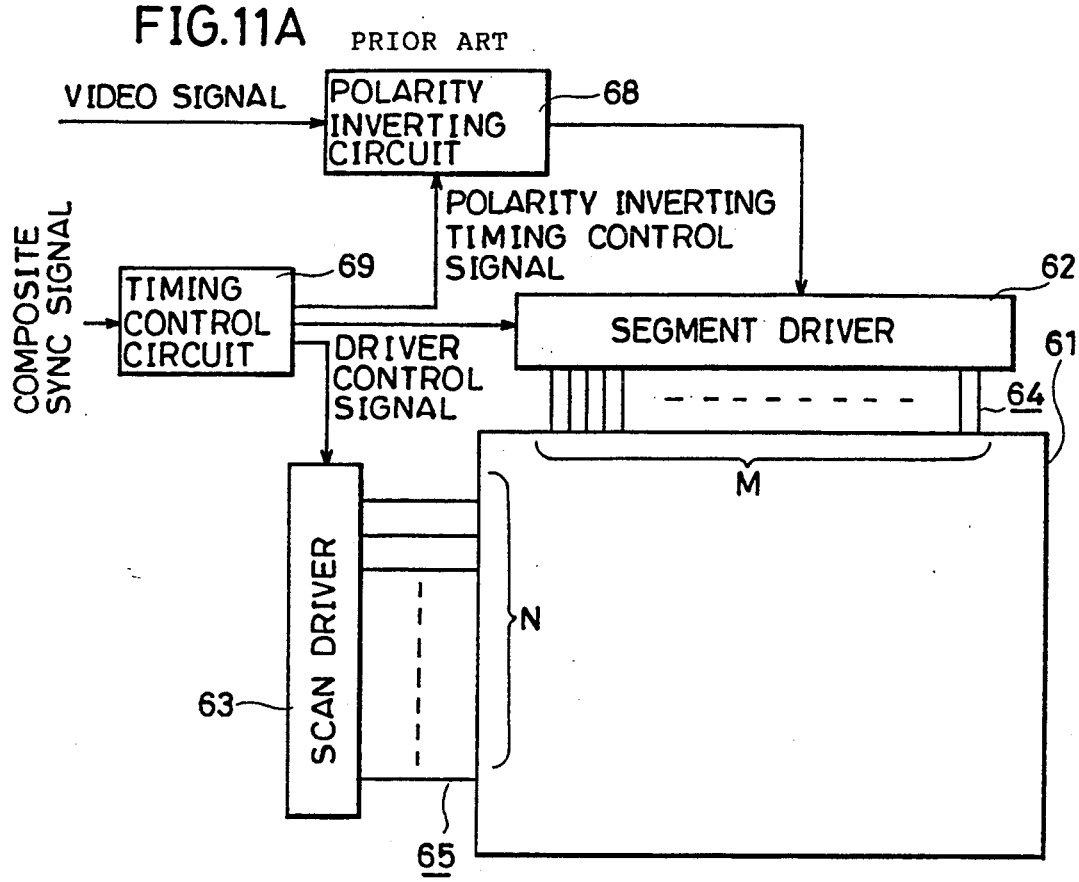
FIG. 11A shows an example of a whole structure of a conventional liquid crystal display device.
Figure 11B:
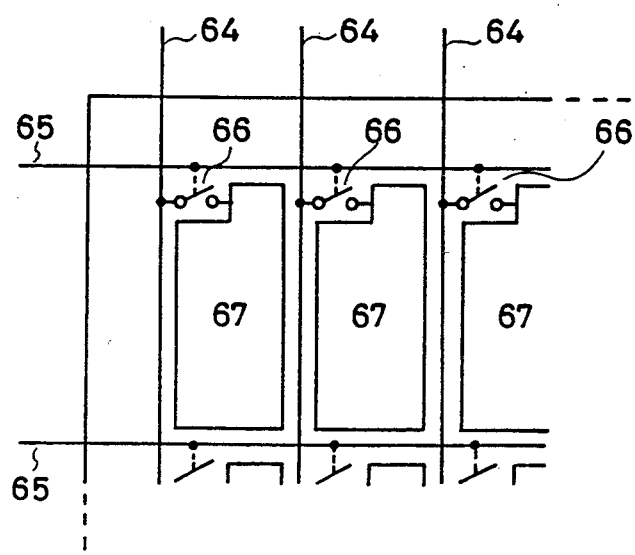
FIG. 11B is a plan view showing a structure of a liquid crystal panel shown in FIG. 11A.
Figure 12:
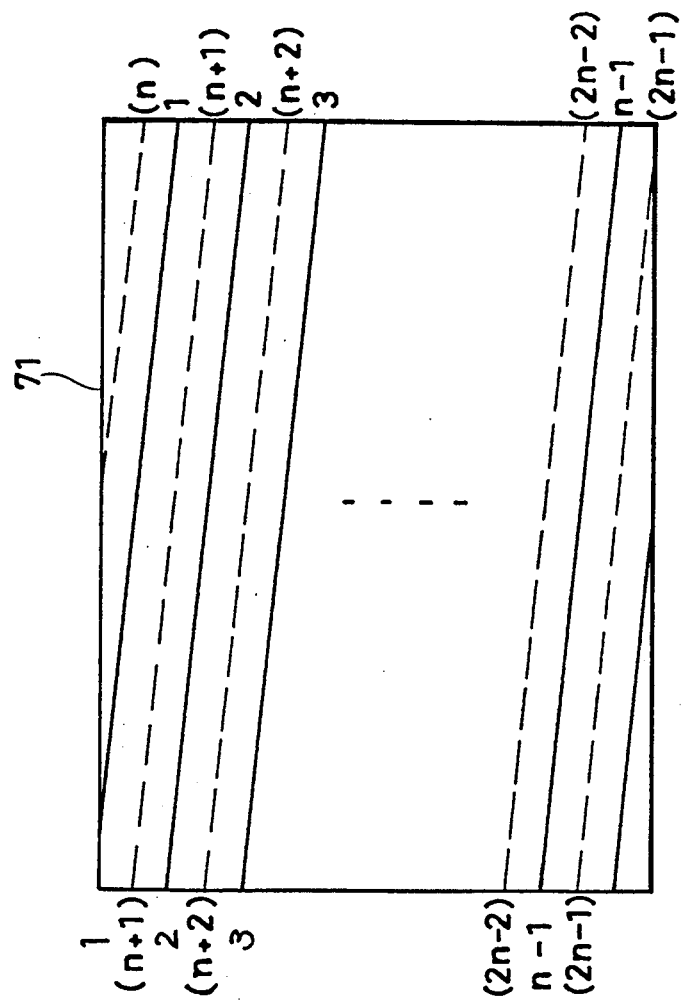
FIG. 12 illustrate interlace scanning.
Figure 13:
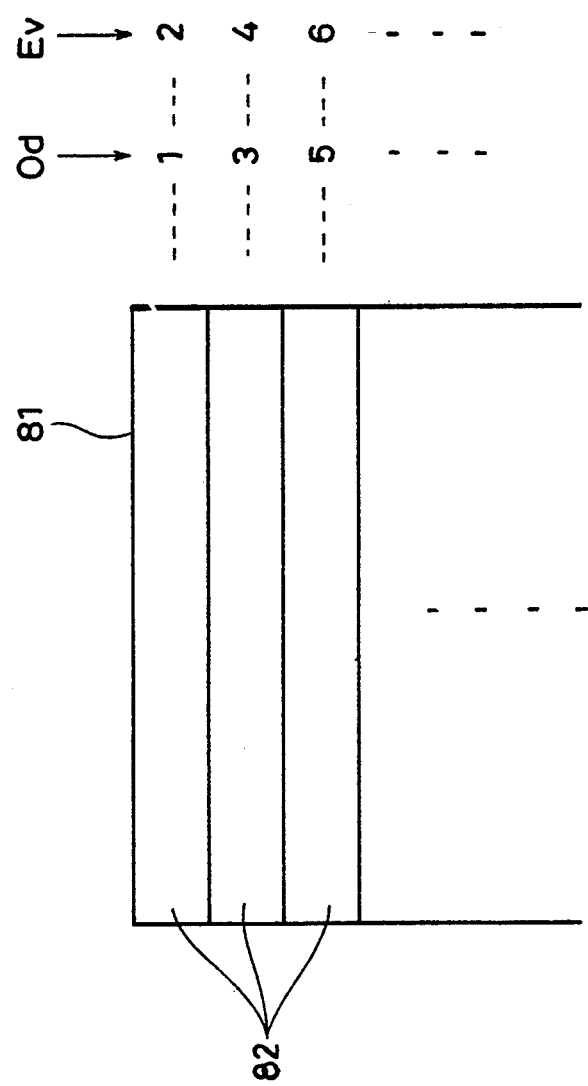
FIG. 13 shows correspondence between the scan lines on the screen of the conventional liquid crystal display device and the scan lines on the screen of the transmitting side.

Accordingly, in the present embodiment, the polarity of the applied video signals are inverted in every 2 field periods (1 frame period) and inverted in every 1 horizontal scanning period H to output the signals to the data signal line 70 in the polarity inverting circuit 110, unlike the conventional device. Therefore, time transition of polarities of the signal voltages applied to the liquid crystal corresponding to respective rows of pixels will be as shown in FIG. 9A or 9B. Which of the patterns shown in FIGS. 9A and 9B is selected depends on the structure of the polarity inverting circuit 110. As shown in FIGS. 9A and 9B, the polarity of the signal voltage applied to each row of pixels is inverted in every 2 field periods, and the timing of inverting the polarity of the signal voltage is shifted from that of the adjacent row of pixels in every 1 field period. Therefore, in the present embodiment, although the time fluctuation of the intensity of light transmitted through each pixel is 15 Hz, there are light intensity fluctuations of four different phases with the phase shifted by 90° from each other when a plurality of rows of pixels are viewed at one time. Therefore, the fluctuations off set each other. Consequently, the basic frequency of the light intensity fluctuations becomes 60 Hz, so that flickers are hardly recognized.

The timing control circuit 120 controls the segment drivers 30 and 55 through a segment driver control signal line 150, the scan drivers 50 and 60 through a scan driver controlling signal line 160 and the polarity inverting circuit 110 through a polarity inverting timing control signal line 170, so that they operate in the above described manner.

Figure 10:
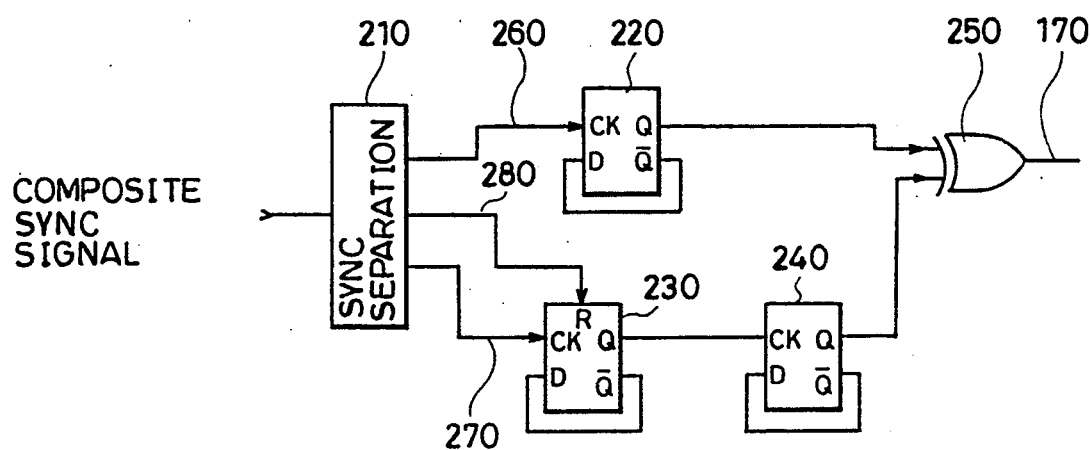
FIG. 10 shows a structure of a reference signal generating circuit included in the timing control circuit of FIG. 6A.

FIG. 10 shows an example of a reference signal generating circuit for carrying out polarity inversion of the data signals. This circuit is included in the timing control signal generating circuit 120 of FIG. 6A. This circuit outputs an inverted reference signal to the polarity inverting timing control signal line 170 for controlling the operation of the polarity inverting circuit 110. A synchronizing separating circuit 210 receives a composite synchronizing signal as an input, and outputs a horizontal synchronizing signal to a horizontal synchronizing signal line 260, a vertical synchronizing signal to a vertical synchronizing signal line 270 and a field signal for determining odd/even field to a field signal line 280, respectively. A flipflop 220 divides the horizontal synchronizing signal for outputting signals with the polarity inverted in every horizontal scanning period. The flipflops 230 and 240 each divides the vertical synchronizing signal for one time. Consequently, the flipflop 240 outputs a signal with the polarity inverted in every 1 frame period. A 2-input exclusive OR circuit 250 receives these two signals as inputs, and outputs signals with the polarity inverted in the every horizontal scanning period and in every 1 frame period. The video signal polarity inverting circuit 110 inverts the inputted video signals in synchronization with the polarity inverting timing of this signal, and outputs the same to the segment drivers 30 and 55 through liquid crystal RGB signal lines 180 for transmitting the original video signals from the transmitting side. Consequently, data signals with the polarity inverted as described above are applied to the data signal lines 70, and, as a result, images without flickers are displayed on the liquid crystal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid crystal display device, comprising:
   converting means for converting original video signals into psuedo video signals by time compressing original video signals of 1 horizontal scanning period of interlace specification to ½, and by interpolating, between each of the compressed signals, a signal which is similar to any of the time compressed signals;
   a liquid crystal panel including scan signal lines the number of which is substantially equal to the number of valid scan lines in 1 frame of television signals, and a plurality of rows of liquid crystal pixels each connected to said scan signal lines;
   each of said rows of liquid crystal pixels including a plurality of liquid crystal pixels;
   scan driver means, operating at a frequency twice as much as horizontal scanning frequency of said original video signals, for successively scanning and driving said scan signal lines on said liquid crystal panel;
   timing control means for shifting operation timing of said scan driver means in a first field constituting 1 frame of said original video signals from operation timing of said scan driver means in a second field constituting said 1 frame, by one half of the horizontal scanning period of said original video signals; and
   segment driver means, responsive to said psuedo video signals, for driving said liquid crystal pixels in a frequency cycle twice as much as the horizontal scanning frequency of said original video signals.

2. A liquid crystal display device according to claim 1, wherein said original video signals are analog signals; and
   said converting means includes,
      analog/digital converting means for converting said original video signals into digital signals, storing means for storing said digital signals converted by said analog/digital converting means for every horizontal scanning period of the original video signals, means for successively reading digital signals of one horizontal scanning period from said storing means, inverting means for inverting polarity of the digital signals read by said reading means in every horizontal scanning period of the original video signals of, and digital/analog converting means for converting the digital signals outputted from said inverting means into analog signals.

3. A liquid crystal display device according to claim 2, wherein said inverting means comprises:

a first path for directly applying the digital signals read by said reading means to said digital/analog converting means;

a second path for applying the digital signals read by said reading means with the polarity inverted to said digital/analog converting means; and means for alternately activating said first and second paths in every ½ horizontal scanning period of the original video signals.

4. A method of driving a liquid crystal display device for driving a liquid crystal panel having scan signal lines, the number of which is substantially equal to the number of valid scan lines of 1 frame of television signals, and a plurality of rows of liquid crystal pixels, each including a plurality of liquid crystal pixels each connected to the scan signal lines, comprising the steps of:

time-compressing signals of 1 horizontal scanning period, of original video signals of interlace specification, into ½;

forming psuedo video signals by interpolating, between said time-compressed signals, a signal similar to any one of the time-compressed signals;

driving, by successively scanning the scan signal lines, by operating a scan driver at a frequency twice as much as the horizontal scanning frequency of the original video signals in a first field, out of a first and second field, constituting 1 frame of the original video signals;

driving, by scanning the scan signal lines, by operating the scan driver at a timing shifted from that in the first field by ½ time period of the horizontal scan period of the original video signals in the second field; and driving the liquid crystal pixels by operating, in response to the formed psuedo video signals, a segment driver at a frequency cycle twice as much as the horizontal scanning frequency of the original video signals, in the first and second fields.

* * * * *